United States Patent [19]

Hammer

[11] 4,152,045
[45] May 1, 1979

[54] OPTICAL WAVEGUIDE WITH PRISM COUPLER FOR PARALLEL LIGHT

[75] Inventor: Jacob M. Hammer, Plainsboro, N.J.

[73] Assignee: RCA Corporation, New York, N.Y.

[21] Appl. No.: 838,659

[22] Filed: Oct. 3, 1977

[51] Int. Cl.² ............................................. G02B 5/14
[52] U.S. Cl. ................................ 350/96.19; 350/96.34
[58] Field of Search ............... 350/96.12, 96.15, 96.19, 350/96.34, 286

[56] References Cited

U.S. PATENT DOCUMENTS

| | | | |
|---|---|---|---|
| 3,533,677 | 10/1970 | Osterberg et al. | 350/96.19 X |
| 3,586,872 | 6/1971 | Tien | 307/88.3 |
| 3,610,727 | 10/1971 | Ulrich | 350/96.19 |
| 3,614,198 | 10/1971 | Martin et al. | 350/286 X |
| 3,694,055 | 9/1972 | Bergman et al. | 350/157 |
| 3,719,411 | 3/1973 | Midwinter | 350/96.19 |
| 3,905,676 | 9/1975 | Ulrich | 350/96.19 |
| 3,944,812 | 3/1976 | Hattori et al. | 350/96.19 X |
| 4,059,338 | 11/1977 | Hartelius | 350/96.19 X |

OTHER PUBLICATIONS

Tien et al, "Modes of Propagating Light Waves in Thin Deposited Semiconductor Films", *Appl. Phys. Ltrs.*, vol. 14, No. 9, May 1969, pp. 291–294.
Midwinter et al., "Experimental Studies of Evanescent Wave Coupling . . . ", *Appl. Phys. Ltrs.*, vol. 16, No. 5, Mar. 1970, pp. 198–200.
Ulrich et al, "Offset Prism for Optical Waveguide Coupling", *Applied Optics*, vol. 13, No. 8, Aug. 1974, pp. 1850–1852.

*Primary Examiner*—John K. Corbin
*Assistant Examiner*—John D. Lee
*Attorney, Agent, or Firm*—H. Christoffersen; Samuel Cohen; Carl V. Olson

[57] ABSTRACT

Couplers for coupling achromatic light having wavelengths of blue through red to and from an optical film waveguide along collinear paths parallel with the waveguide. Each coupler is constituted by a prism made of a material which, over the range of wavelengths of interest, has a change in refractive index which differs from the change in refractive index of the waveguide film by less than 0.5 percent of the refractive index of the prism material.

4 Claims, 1 Drawing Figure

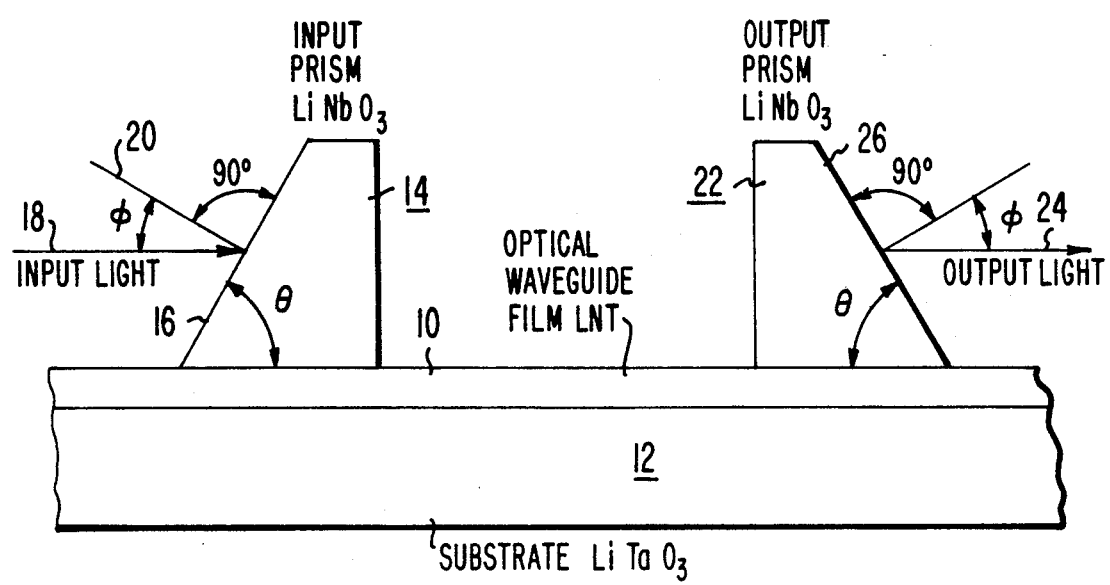

OPTICAL WAVEGUIDE WITH PRISM COUPLER FOR PARALLEL LIGHT

There are many applications in which it is necessary to couple an input light beam to an optical waveguide film, where signal processing may take place, and then couple the light out from the waveguide film as an output beam. In such applications it is usually desirable that the output light beam follow a path which is an in-line extension of the path of the input light beam, and that input and output beams are parallel with the optical waveguide film. It is known to provide input and output prisms on a waveguide, the prisms being designed so that input and output beams are collinear when the light has a single color made up of light energy within a narrow range of wavelengths.

According to an example of the present invention, achromatic light having a range of wavelengths is coupled to and from an optical waveguide film by means of prisms made of a material having a dispersive behavior substantially equal to that of the waveguide film.

The sole FIGURE of the drawing is an elevation showing input and output prisms mounted on an optical waveguide film for coupling achromatic light to and from the waveguide.

The drawing shows an optical waveguide film 10 on a substrate 12. The film 10 may be a LNT material having a generalized formula $LiNb_xTa_{1-x}O_3$, where x can range from zero to 0.3. The substrate 12 may be a lithium tantalate material having a formula $LiTaO_3$.

An input prism 14 has a base surface in intimate contact with the waveguide film 10 and has a light-receiving face 16 at an angle $\theta$ with the base. The face 16 receives an input light beam 18 which is parallel with the waveguide film 10, and at an angle $\phi$ with a normal 20 to the face 16. The angle $\phi$ equals $90-\theta$. An identical output prism 22 receives light from the waveguide film and directs it along an output path 24 parallel with film 10 from a face 26 of the prism 22. The face 26 has an angle $\theta$ with the base of the prism 22.

The prisms 14 and 22 may be made of lithium niobate having a formula $LiNbO_3$ when the waveguide film 10 is made of lithium niobate tantalate having a formula $LiNb_xTa_{1-x}O_3$. Suitable materials for the prisms 14, 22 and the waveguide film 10 must have refractive indices $n_p$ and $n_g$, respectively, which satisfy the formula:

$$\sin \phi = n_p \sin [(\sin^{-1} \frac{n_g}{n_p}) - \theta] \quad (1)$$

In the desired mode of operation, where the output light beam 24 is collinear with input light beam 18, the angle $\theta$ equals $90-\theta$, and formula 1 may be rearranged as follows:

$$\tan \theta = \left(\frac{n_g - 1}{n_p}\right) \left[\cos\left(\sin^{-1} \frac{n_g}{n_p}\right)\right]^{-1} \quad (2)$$

It is seen from formula 2 that the angle $\theta$ of the prism depends on the ratios $(n_g-1)/n_p$ and $n_g/n_p$. However, the values of refractive indices for $n_g$ and $n_p$ for given materials are different for different wavelengths of light. Consequently, for a given prism angle $\theta$ calculated from formula 2 to be suitable for parallel collinear coupling of light of different wavelengths, it is necessary that the refractive indices $n_g$ and $n_p$ the materials selected vary with wavelengths in the same direction and in substantially the same amounts. The refractive index $n_p$ of the prism must be larger than the refractive index $n_g$ of the waveguide film. The refractive indices for the materials given at different wavelengths (colors) of light, and the values of prism angle $\theta$ for the "$\bar{O}$" ordinary axis of propagation wave calculated from formula 2 are given in Table I.

TABLE I

| | LIGHT | Refractive Indices | | Prism Angle |
|---|---|---|---|---|
| Color | Wavelength $\lambda$ in Å | Waveguide $n_g$ of LNT | Prisms $n_p$ of $LiNbO_3$ | $\Theta$ From formula 2 |
| Red | 6328 | 2.193 | 2.294 | 60.56° |
| Green | 5228 | 2.2275 | 2.332 | 60.65° |
| Blue | 4416 | 2.285 | 2.389 | 61.52° |

It can be seen from Table I that over the range of wavelengths listed, the angle $\theta$ varies over a range of 0.96 degrees, which is less than 1°. From this it can be concluded that prisms made of $LiNbO_3$ have a dispersive behavior which is sufficiently similar to that of the LNT waveguide film to provide collinear input-output couplings of light having wavelengths in the range from red to blue.

Dispersion is conventionally defined as the amount of change in refractive index over the range of wavelengths of interest. If the change in refractive index $n_p$ of the prisms material differs from the change in refractive index $n_g$ of the waveguide film material by less than 0.5 percent of the refractive index of the prism, then the materials have substantially equal dispersive behaviors, and parallel, collinear, achromatic coupling of light is achieved.

Waveguide materials other than LNT which satisfy the necessary conditions are found in the sputtered glasses. Here there is a wide choice of dispersions and refractive indexes. As just one of many examples, if the waveguide is made of Schott LaF20 glass which has $n_g \approx 1.682$ with $\Delta n_g = 0.014313$ between $\lambda = 4800$ Å, and $\lambda = 6440$ Å, and the prism is made of Schott LaF21 glass with $n_p = 1.788$ and $\Delta n_p = 0.016802$ between the same wavelengths, the condition for parallel achromatic coupling will be satisfied. This condition can readily be met by combining many well known optical glasses.

As another example, there have been many waveguides made by diffusing Titanium into $LiNbO_3$. In this case a prism made by heavily diffusing Titanium into the same material will work very well. Another useful example is that of GaAs. Here the diffusion of aluminum into GaAs is known to decrease the refractive index. Thus an aluminum GaAs waveguide may be coupled with a prism made of GaAs.

What is claimed is:

1. Means for coupling achromatic light having wavelengths within a given range to or from an optical waveguide along a path parallel with the waveguide, comprising an optical waveguide film on a substrate, and a prism having a base on said waveguide film and having a face positioned in said path and at an angle $\theta$ with said base, said prism being made of a material having a refractive index $n_p$ which is higher than the refractive index $n_g$ of the waveguide, and having a dispersive behavior substantially equal to the dispersive behavior of the material of the waveguide film.

2. Means as defined in claim 1 wherein said range of wavelengths includes the wavelengths of blue through red light.

3. Means as defined in claim 1 wherein, over the range of light wavelengths of interest, the change in refractive index $n_p$ of the prism material differs from the change in refractice index $n_g$ of the waveguide film material by less than 0.5 percent of the refractive index of the prism.

4. Means as defined by claim 1 wherein said angle $\theta$ is in accordance with the formula:

$$\tan(\theta) = \left(\frac{n_g - 1}{n_p}\right)\left[\cos\left(\sin^{-1}\frac{n_g}{n_p}\right)\right]^{-1}$$

* * * * *